Aug. 26, 1969     L. W. MEREDITH     3,462,921
CROP ROW CORN HARVESTING APPARATUS
Filed June 16, 1967     9 Sheets-Sheet 1
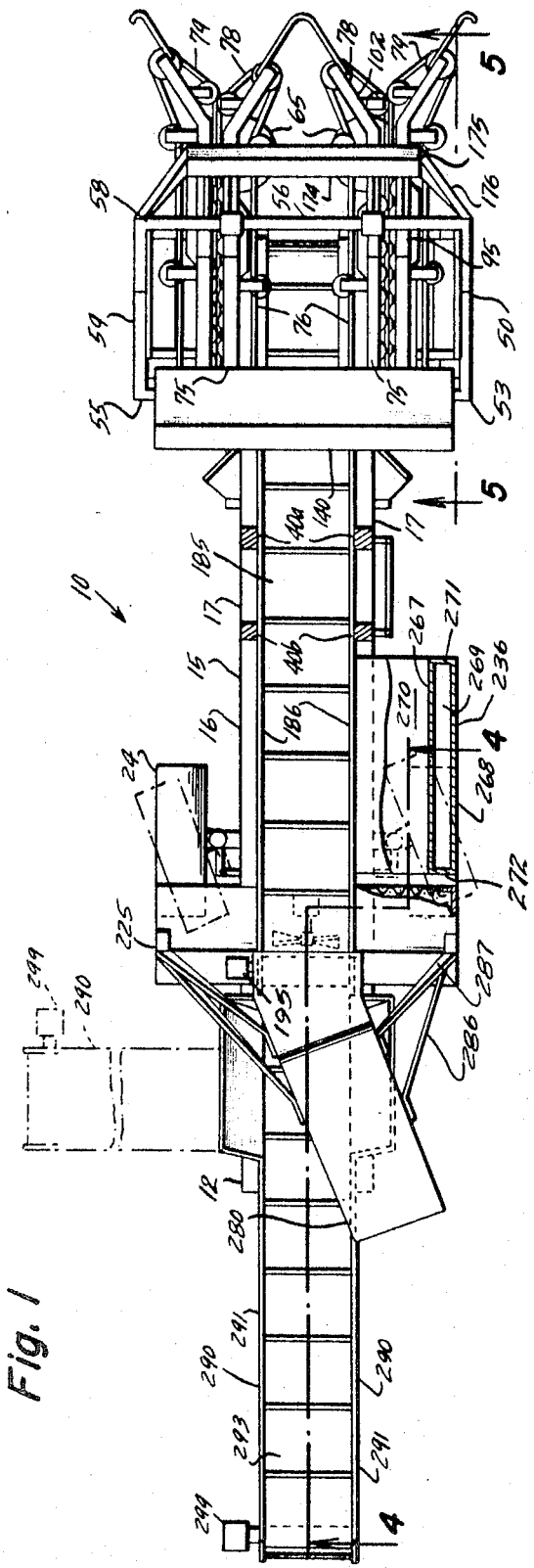
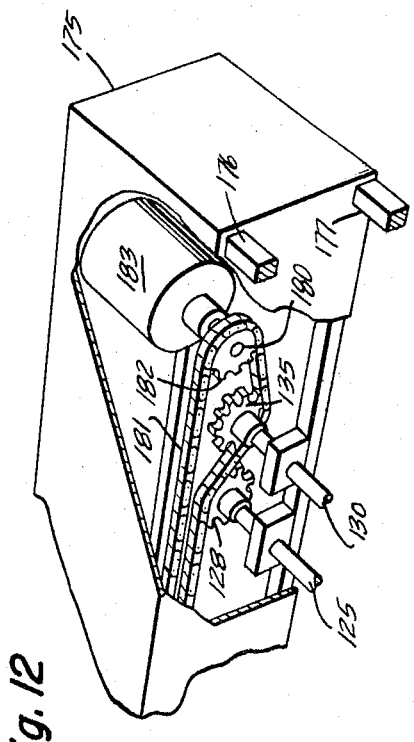
INVENTOR:
Loren W. Meredith
BY Roger L. Martin
ATTORNEY Aug. 26, 1969   L. W. MEREDITH   3,462,921
CROP ROW CORN HARVESTING APPARATUS
Filed June 16, 1967   9 Sheets-Sheet 2

INVENTOR:
Loren W. Meredith
BY Roger L. Martin
ATTORNEY

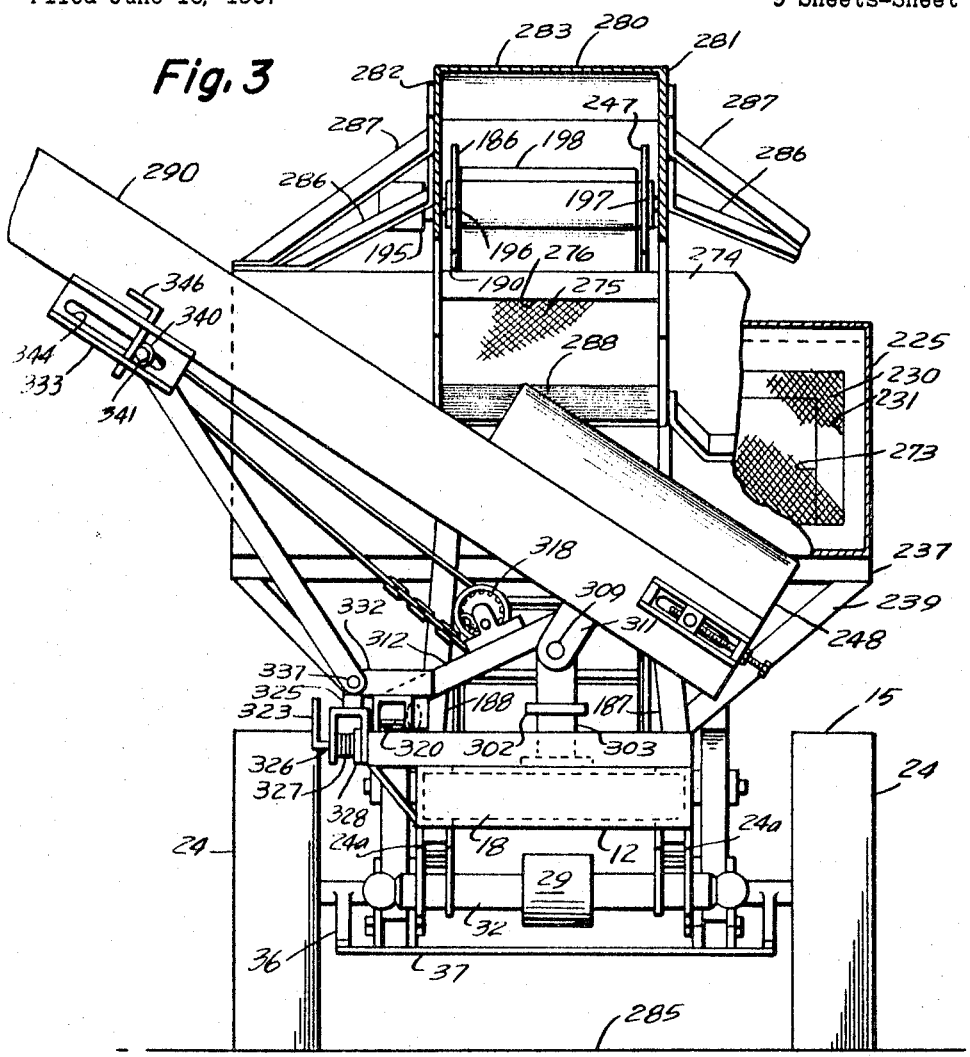

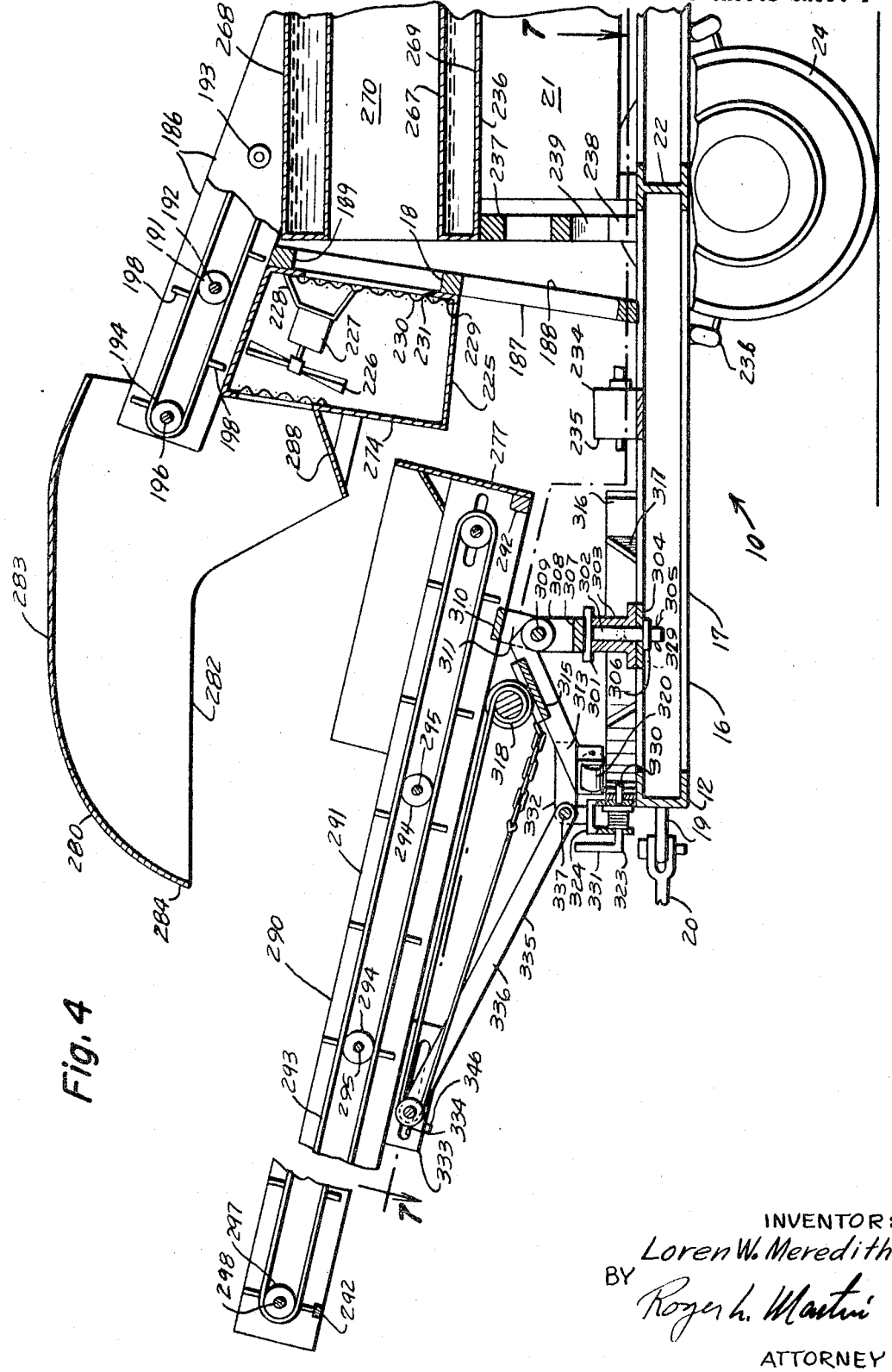

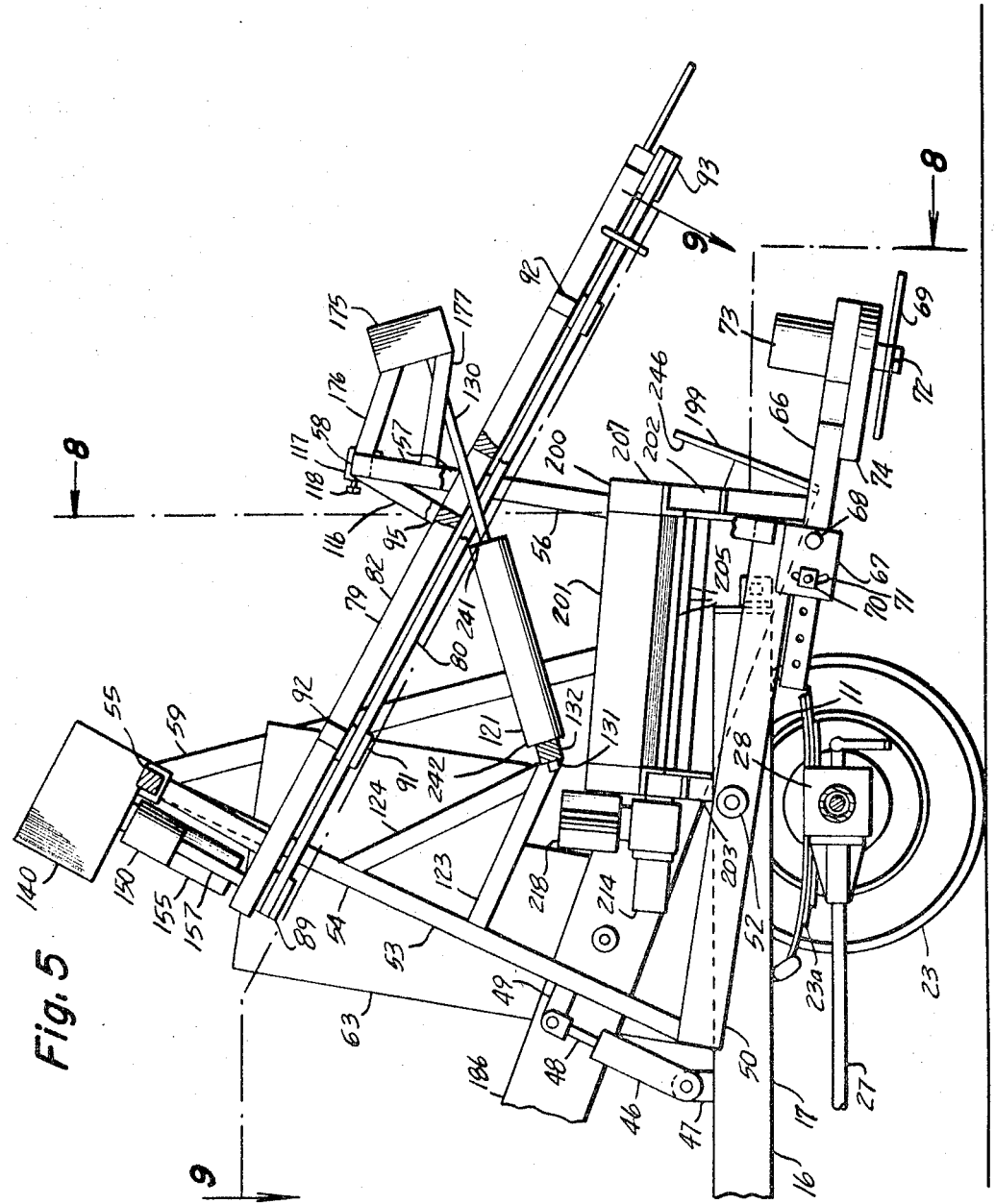

Aug. 26, 1969  L. W. MEREDITH  3,462,921
CROP ROW CORN HARVESTING APPARATUS
Filed June 16, 1967  9 Sheets-Sheet 6

INVENTOR.
Loren W. Meredith
BY Roger L. Martin
ATTORNEY

Aug. 26, 1969  L. W. MEREDITH  3,462,921
CROP ROW CORN HARVESTING APPARATUS
Filed June 16, 1967  9 Sheets-Sheet 7

INVENTOR.
Loren W. Meredith
BY Roger L. Martin
ATTORNEY

Aug. 26, 1969      L. W. MEREDITH      3,462,921
CROP ROW CORN HARVESTING APPARATUS
Filed June 16, 1967      9 Sheets-Sheet 8
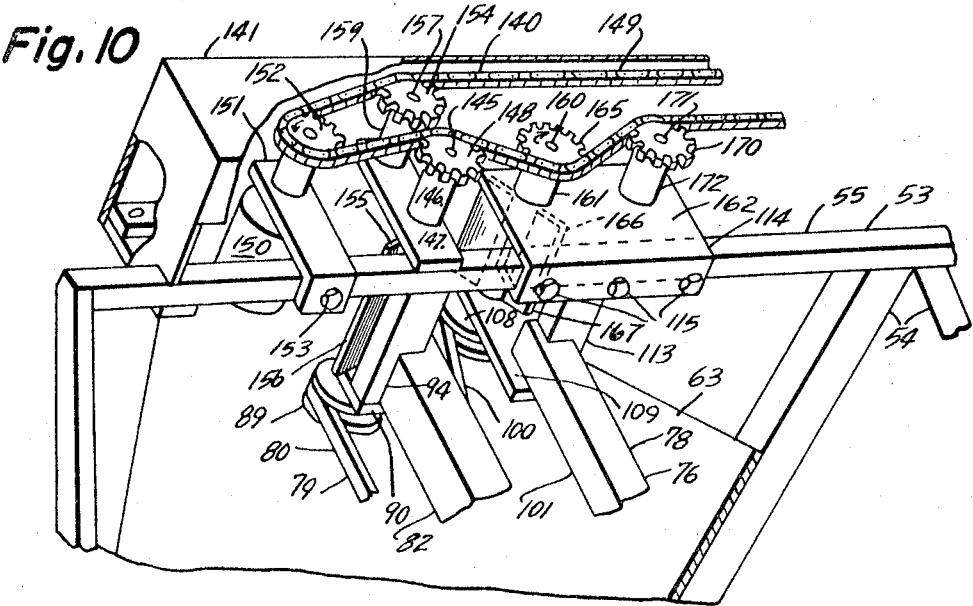
INVENTOR.
Loren W. Meredith
BY
ATTORNEY Aug. 26, 1969

L. W. MEREDITH 3,462,921

CROP ROW CORN HARVESTING APPARATUS

Filed June 16, 1967

INVENTOR.
Loren W. Meredith
BY Roger L. Martin
ATTORNEY

United States Patent Office 3,462,921
Patented Aug. 26, 1969

3,462,921
CROP ROW CORN HARVESTING APPARATUS
Loren W. Meredith, 1150 E. Main St.,
Pahokee, Fla. 33476
Continuation-in-part of application Ser. No. 487,406,
Sept. 15, 1965. This application June 16, 1967, Ser.
No. 646,558
Int. Cl. A01d 45/02
U.S. Cl. 56—17                                                    11 Claims

ABSTRACT OF THE DISCLOSURE

The disclosure relates to a crop row corn harvester which is particularly useful in harvesting green corn such as sweet corn. The harvester is shown in the form of a two row harvester adapted for use with support vehicles. The harvester has a picking mechanism which is designed to strip the ears from ear laden stalks that have been previously severed from the ground and hence includes an appropriate mechanism for cutting the standing stalks. The mechanism has a conveyor for the cut stalks and which is arranged to cooperate with a stripping assembly in separating the ears by an action that bends the ears toward the butt end of the stalk in accomplishing the separation. The stripping assembly provides a space in which the ears are trapped during their movement by the conveyor and this assembly has a pair of moving components that prevent the ears from becoming wedged in the trapping space provided in the assembly. The moving components are shown in the form of smooth surfaced cylindrical rolls which are so designed and operated as to minimize damage to the ears as they are being stripped from the stalks. Provisions are made for gathering the ears in a conveyor that is used to transport the harvest through a stream of air which is used to separate trash foliage and other unwanted accumulations from the harvested crop. The harvester has yet another conveyor which is adjustably mounted on a mobile vehicle supporting the harvesting equipment and which is provided for feeding the harvested crop to support vehicles used in conjunction with the harvester.

Cross reference to related application

This application is a continuation in part of the inventors co-pending application Ser. No. 487,406, filed Sept. 15, 1965, and entitled "Corn Harvester and Associated Apparatus."

Background of the invention

The invention relates to a crop row corn harvester which is useful in harvesting green corn such as sweet corn.

Corn harvesters in various forms are known in the art and for the most part such harvesters are designed for the harvesting of ripe corn which becomes dry on the stalk. In some of such harvesters, the crop is harvested from the standing stalks whereas in others the stalks severed before the ears are removed from the stalks. In mechanisms that include so-called snap rolls and between which the stalks are conveyed butt end first so as to pinch ears at their base in accomplishing their separation from the stalk. In such harvesters there is little concern for damage to the corn kernels and much less to damage to the surrounding ear foilage for in most cases the picking equipment is operated in conjunction with a husking device.

In the case of harvesting green corn such as sweet corn however damage to the kernels should be avoided and where the ears are to be marketed with the surrounding foliage as in the case of fresh sweet corn, damage to the foliage affects the government grading and hence the market value of the harvested crop.

The harvester forming the subject matter of the invention has a picking mechanism that separates the ears from the cut corn stalks and accomplishes this by equipment that bends the ears toward the butt end of the stalk during the separation process. This method of stripping the ears from cut corn stalks has been advocated previously, but the apparatus used by the advocates causes damage to the husks or foliage that surrounds the ears and also to the corn kernels. Consequently the apparatus is unacceptable for use in harvesting green corn. In addition the picking mechanisms advocated to handle the cut stalks are complicated and expensive and frequently rely on the use of different types of mechanisms for conveying the ear laden stalks through the stripping assemblies.

Among the objects to prior art harvesters are the lack of adequate equipment for handling the harvested crop in the field in a manner such as to enable continual usage of the harvester, and the lack of adequate means for separating trash foliage and other unwanted accumulations from the harvested crop.

Summary of the invention

The invention relates to improvements in crop row corn harvesters.

A general object is to provide improvements in corn harvesting equipment.

One object is to provide an improved picking mechanism for corn harvesters and which enables the harvester to be used in harvesting green corn without appreciable damage to the corn kernels and the surrounding foliage.

Yet another object is to provide improved picking mechanisms for corn harvesters that first severe the stalks from the ground before separating the ears from the stalk, and which enable the ears to be separated from the severed stalks by a bending action wherein the ears are bent toward the butt end of the stalk and all without appreciable damage to the ears.

Yet a further object is to provide improved picking mechanisms for corn harvesters that first sever the stalk from the ground before the ears are removed from the stalk and wherein the handling of the stalks is simplified and adapted to the rapid and efficient separation of the ears with a minimum of damage thereto.

Another object is to provide improvements in corn harvesters and which facilitate the field separation of trash and other accumulations from the harvested crop.

The picking mechanism of the improved harvester is designed to separate the ears from severed stalks by a process that involves bending the ears toward the butt ends of the stalks. In accomplishing this in accord with the invention, a pair of spaced elongated components are provided to form a trap for the ears on the stalks and a stalk conveyor is provided with endless means having confronting flights for gripping the cut stalks above the ears and for pulling the ear laden stalks dependingly through the trap. The stalk conveyor is shown in a form which uses endless belts in the preferred embodiment shown hereinafter although other endless means such as suitable endless chains may be also employed.

A pair of spaced rolls are provided for forming the trap in accord with one aspect of the invention and these rolls are driven in a manner such as to prevent the ears from becoming wedged in the space between the rolls during the operation of the picking mechanism. The arrangement here in accord with this aspect is such that the roll movement aids in urging the ears to bend toward the butt ends of the stalks, and rolls in accord with this aspect of the invention are provided with smooth continuous surfaces which are preferably cylindrical since this has been found to minimize the amount of damage that occurs to the ears during the operation of the picking mechanism by minimizing the amount of frictional resistance between the ears and the trap forming components.

The picking mechanism in accord with other aspects of the invention is mounted on a frame at the front of a self-propelled vehicle and the vehicle is provided with a means for moving the frame to raise and lower the receiving end of the stalk conveyor so as to facilitate adjusting the conveyor to the height of the crop along the rows of standing corn.

Yet another aspect of the invention relates to a novel arrangement for separating trash foliage and other accumulations which are gathered with the havested crop during the operation of the picking mechanism. Still other aspects of the invention relate to providing a conveying system for the harvested crop which permits the use of the harvester with support vehicles for hauling the crop to other locations and wherein means are provided in the conveying system for separating trash foliage and other matter which accumulates with the harvested crop during the normal operation of the picking mechanisms.

Brief description of the drawings

A preferred embodiment of the invention is shown in the drawings and wherein:

FIG. 1 is a diagrammatic top plan view of the harvester embodying the invention with certain parts broken away and others in section.

FIG. 3 is a rear elevational view of the harvester shown in FIGS. 1 and 2 with certain parts broken away and others removed and with an auxiliary conveyor component for the harvester shown in a laterally extending position which is generally shown in broken lines in FIG. 1.

FIG. 4 is a vertical section view generally along the lines 4—4 of FIG. 1.

FIG. 5 is a vertical section view showing certain components of the picking mechanism as seen along the lines 5—5 of FIG. 1.

FIG. 10 is a diagrammatic perspective view showing the drive arrangement of the stalk conveyor at the right hand side of the harvester together with portions of the stripping roll assembly associated therewith, certain parts being broken away and others removed.

FIG. 11 is a diagrammatic perspective view of the gathering roll assembly and adjacent structure at the right side of the harvester.

FIG. 12 is a diagrammatic perspective view of the drive arrangement for the stripping rolls of the picking mechanism at the right side of the harvester with certain parts being broken away.

Description of preferred embodiment

Figure 2:
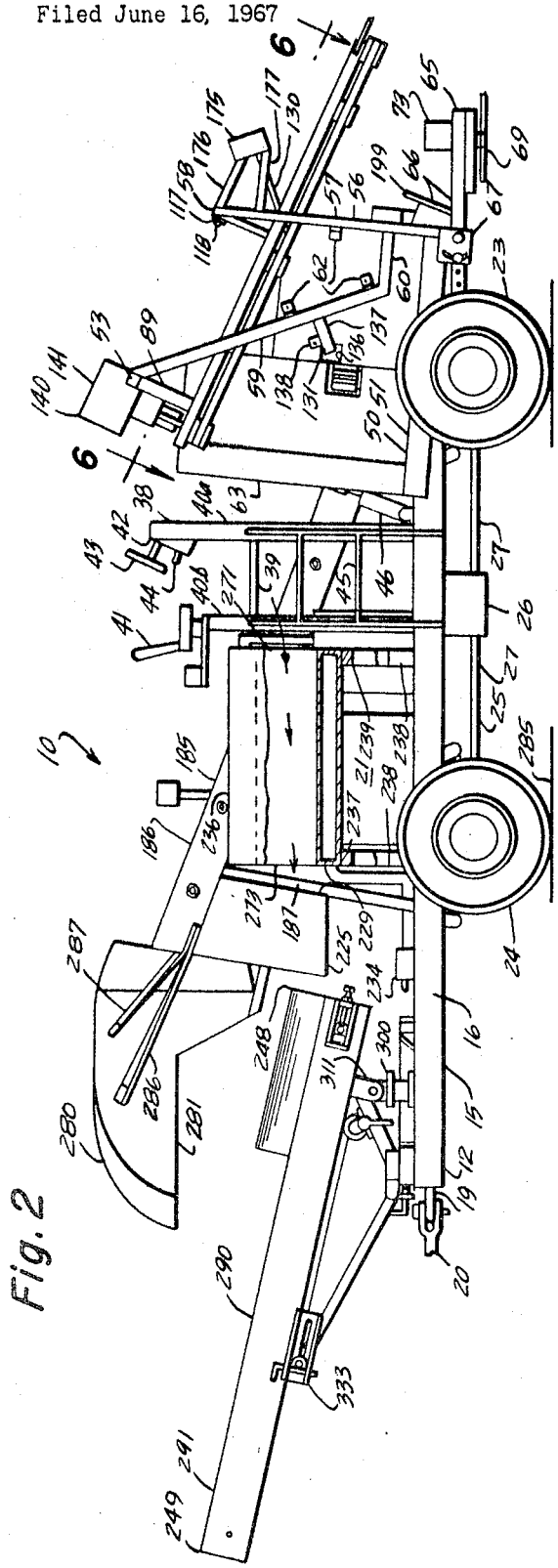
FIG. 2 is a diagrammatic side elevational view of the right side of the harvester shown in FIG. 1 with certain parts broken away.

Reference is now made to the drawings and wherein the apparatus aspects of the invention are shown embodied in a mobile harvester designated at 10. The harvester 10 is so equipped as to be capable of harvesting the ears of corn in two rows of standing corn with each pass through a corn field and comprises a self-propelled vehicle 15 which is equipped at the front end 11 with a rigid frame 50. The cutting mechanisms 65 and picking mechanisms 75 of the crop row harvester are mounted on this frame 50. Each cutting mechanism serves as a means for severing the standing stalks from the ground along a row of corn as the vehicle 15 advances through the field and each picking mechanism 35 serves as a means for detaching or separating the ears of corn from the severed stalks.

Each picking mechanism is equipped with a stalk conveyor 76 that serves to convey the severed stalks through a stripping roll assembly 77 of the mechanism 75 and in the latter assembly 77, the ears are stripped from the severed stalk by being bent toward the butt ends of the stalks. The conveyor assemblies 76 have a common drive mechanism, designated generally at 140, and the stripping assemblies 77 of the picking mechanisms also have a common drive mechanism designated at 174.

The harvester 10 has a pair of gathering roll assemblies 200 which are associated with the respective picking mechansims and these assemblies serve to move the severed ears onto an elongated conveyor 185 used to transport the severed ears rearwardly on the vehicle. This elongated main conveyor 185 discharges the gathered ears through a stream of air provided by a fan to separate trash foliage accumulations and onto an auxiliary conveyor 290 which is mounted at the rear end 12 of the vehicle and used to transport the harvested crop to other vehicles, such as to a trailed vehicle, truck, wagon or the like, and which may be used in hauling the crop to remote packing stations, cooling stations or elsewhere. The auxiliary conveyor 290 is so mounted on the vehicle 15 as to enable the crop to be discharged from the conveyor 290 onto a vehicle that is trailed behind the harvester or onto a vehicle operating at the left side of the harvester.

The vehicle 15 has a rigid chassis 16 that includes elongated side beams 17 which are rigidly interconnected at the rear end 12 of the vehicle by a transverse channel beam 18. Here the chassis is equipped with a hitch 19 which provides a means for connecting the vehicle to the draw bar 20 of a trailing vehicle.

The vehicle 15 is equipped with a suitable power plant such as a diesel motor 21 and which is supported on transverse I-beam components 22 of the chassis 16. The chassis 16 is supported on front and rear side wheels, designated at 23 and 24, through conventional leaf spring suspensions 23a and 23b. The vehicle shown has a conventional four-wheel drive mechanism 25 which includes a front wheel differential drive 28 and a rear wheel differential drive 29 and these drives are drivingly connected to the motor transmission 26 by means of drive shafts 27.

A conventional hydraulic four-wheel steering mechanism 30 is also provided. The rear wheel steering components are in general shown in FIG. 7 as including a hydraulic cylinder 31 which is pivotally connected at its base end to the axle housing 32 for the rear wheels 24. The piston arm 33 of the hydraulic cylinder is pivotally connected to an arm 34 at the left wheel universal joint. Here the mechanism 30 is provided with another arm 36 which is pivotally connected to a tie rod 37 that connects with a similar lever arm for the right rear wheel in a manner well known in the art. Mechanism 30 greatly facilitates the maneuverability of the harvester and materially aids the operator to follow the row pattern of the standing crop.

Between the front and rear wheels of the vehicle an elevated platform 39 is provided for the operator of the harvester and this platform 39 is supported on an upright frame 38 which straddles the main conveyor. Frame 38 has upright front and rear side posts 40a and 40b which are rigidly mounted on the chassis side beam 17, and a seat 41 is mounted on the frame for the operator. Frame 38 supports a control panel 42 in front of the seat and which has a steering wheel 43 and suitable levers 44 for controlling the various other hydraulically powered components of the harvester. A ladder 45 is provided on the right side of frame 38 to facilitate entry to and exit from the platform area.

As previously indicated the picking mechanisms are carried on a rigid frame 50 which is mounted on and located at the front end 11 of the vehicle. This frame 50 can be caused to pivot and includes a pair of side beams 51 at the base of the frame and which are pivotally connected to the adjacent side beams 70 of the chassis by means of aligned pivot elements 52, elements 52 connect the frame 50 to the front end of the vehicle and are located adjacent to the front wheels of the vehicle.

The rear section 53 of the frame 50 includes a transverse member 55 on which the drive mechanism 140 for the stalk conveyors is mounted and this member 55 is supported centrally at the apex of an A-frame having inwardly inclined side members 54 which are welded to the rear ends of the side beams 51 at the base of the frame work 50. The front section 56 of frame 50 has a transverse structural member 58 which is used in part to support the conveyor assemblies 76. This transverse member 58 is supported spacedly above the side beams 51 at the front of the frame 50 by means of upright side members 57 that are fixed to the front ends of the side beams 51. At the sides of the frame 50, sections 53 and 56 are rigidly interconnected by inclined side members 59 that are fixed to the ends of the transverse member 55 at the top of the frame section 53. These members 59 are provided with forward extensions 60 at their lower ends and which are welded to the adjacent uprights 57 of the front frame section 56.

At the outboard side of each picking mechanism there is a rectangular plate 61 which is bolted to lugs 62 that are welded to members 57 and 59 as seen in FIG. 2. These plates serve to deflect severed ears back onto the adjacent gathering rolls and which during the operation of the equipment are occasionally thrown laterally of the picking mechanisms.

Each inclined member 54 of the A-frame also supports a rectangular plate 63. The top of this plate 53 is located at the inboard side of the adjacent conveyor assembly and the lower end of the plate is arranged to deflect the stripped stalks to the side of the frame 50 as they are released from the conveying assembly.

Frame 50 is arranged to pivot so that the cut stalk conveyors 76 can be adjusted to a proper height commensurate with the growth pattern of the stalks along the rows and for this purpose a pair of hydraulic cylinders are mounted on the chassis in back of frame 50. The base of each cylinder 46 is pivotally connected to an upright lug 47 which is appropriately mounted on the adjacent side beam 17 and the piston arm 48 of the cylinder is pivotally connected to a rearwardly projecting strap 49 which is fixed to the adjacent side member 54 of the A-frame. From the control panel, the operator is able to control the extension and retraction of the piston arms 48 to cause the frame 50 to pivot about the pivot axis established by the aligned pivot elements 52 and thus is able to control the hydraulically powered means for raising and lowering the front ends of the conveyor assemblies.

The harvester has separate cutting mechanisms 65 which are associated with the respective picking mechanisms and each is carried in front of the front end 11 of the vehicle and at the front end of an arm 66 which is pivotally connected by a pivot element 68 to a plate 67 that is welded to the front end of the adjacent side beams 51. The arm 66 is clamped to the plate 67 by a bolt type fastener 70 that has a shank which extends through a slot 71 in the plate when the harvester is in use. By releasing the bolt 70 however, arm 66 can be caused to pivot about the axis of the pivot element 68 so as to adjust the vertical height of the cutting mechanisms at the front of the arm. The slot 71 is provided to facilitate movement of the fastener when such minor adjustments in height of the mechanism 65 are being made.

Each cutting mechanism shown in the illustration has a blade 69 which is fixed to rotate with the shaft 72 of the hydraulic motor 73 which in turn is mounted at the front end of the pivot arm. An annular shield 74 is provided to prevent entanglements around the shaft motor 72. It is deemed evident that as the vehicle advances along a row of corn, the stalks are cut through contact at the sides of the shield with the rotating blade 69.

Each picking mechanism as previously indicated has a conveyor assembly 76 which is provided for moving the cut stalks through the stripping assembly and wherein the ears are stripped from the stalk before the stalk is released by the stalk conveyor.

Each stalk conveyor 76 is equipped with a pair of endless driven belts, 80 and 100, which are so adapted and arranged in the conveyor assembly as to have working flights 98 and 99 which confront. These confronting flights 98 and 99 have an upwardly and rearwardly inclined path 219 of movement that extends over the space 163 between the roll components 120 and 121 of the stripping assembly 77 associated with the conveyor. The arrangement is such that the confronting flights 98 and 99 are adapted to grip the upper ends 243a of the stalks severed by the cutting mechanism and to carry the ear laden stalks along the flight path from their upper ends 243a. As thus gripped, the stalks hang down from the working flights and the working flights 98 and 99 provide a means for pulling the severed stalks through the space between the trapped forming components of the stripping assembly.

Each stalk conveyor assembly 76 in the embodiment illustrated has a component 79 at the outboard side of the assembly and which is fixed to the frame 50. Each conveyor also has another component 78 at the inboard side of the assembly and this component 78 is adjustably mounted on the frame 50.

The outboard component 79 of the conveyor 76 includes the endless belt 80 and this belt is trained around pulleys that are mounted on an elongated structural member 82 which is suspended from frame 50. Member 82 has an angled extension at the front end of the conveyor and it is provided with a cutout 84 generally intermediate its opposite ends to facilitate the location of the drive shaft for one of the rolls. Opposite the cutout 84, member 82 is strengthened by a rigid structural section 85.

Among the pulleys for the endless belt 80 are a plurality of idler pulleys which are mounted at the bottom of structural member 82 and which are aligned and closely spaced apart to adequately support the working flight 98 of the belt against appreciable deflection when the assembly is in use. The front pulley 87 is also arranged in working alignment with the other idler pulleys but is supported on a bracket which is secured to the angled extension 83.

The drive pulley 89 for the outboard belt 80 is mounted below a rearwardly extending plate 90 which is fixed at the rear end of the structural member 82. The return flight of the belt is guided in its return by three idler pulleys 91 that are mounted on appropriately spaced and laterally extending brackets 92 and by another pulley 93 which is mounted at the outer end of the extension 83.

As best seen in FIG. 10 the outboard component 79 is suspended from the cross beam 55 of the frame section 53 by means of a depending member 94 which is fixed to member 55 at its upper end and below that to the rear end of the structural member 82. From the transverse beam 58 of the front section of frame 50 the outboard component is suspended by a depending member 95 which is fixed to the under side of beam 58 and therebelow to member 82.

The inboard component 78 of the stalk conveyor 76 includes the endless belt 100. Belt 100 is trained around a plurality of pulleys which are supported by an elongated structural member 101 that is similar to member 82. Member 101 has an angled extension 102 at the front end and also has a cutout 103 and a strengthening section 104 adjacent the cutout. The slot 103 is provided to accommodate the location of the shaft for the other roll of the stripping assembly.

Among the pulleys for belt 100 are a plurality of idler pulleys which are mounted along the bottom of the structural member 101 and which are aligned and closely spaced to also prevent the working flight 99 of the belt from deflecting appreciably during use. The arrangement of these pulleys 105 is such in comparison to the arrangement of pulleys 86 that they operate to support the belt in the space between adjacent pulleys of the aligned idler pulleys 86 for the outboard belt 80.

The feed end pulley 106 of the inboard component 78 is mounted on a bracket 107 fixed to the angled extension 102 in arrangement which is somewhat offset from the feed end pulley 87 of component 79 for similar reasons. The drive pulley 108 of component 78 is mounted beneath a plate 109 which is fixed to the rear end of the support component 101. The return flight for belt 100 is guided by three idler pulleys 110 which are also mounted on laterally extending brackets 111 fixed to the support member 101 and by an end pulley 112 which is mounted at the outer end of extension 102.

The inboard component 78 is suspended from the transverse beam 55 of the rear section 53 by means of a structural member 113 and is fixed to the end of member 101 and thereabout to an adjustable bracket 114. Bracket 114 is bolted to member 55 by bolt type fasteners 115 and which are releasable to enable the bracket to be slid along member 55 when the need arises to replace one of the belts or other elements of the stalk conveyor components 78 and 79.

The inboard component is also suspended from the transverse member 58 of the front frame section 56. Here the support member 101 is fixed to the bottom end of a depending member 116 which is fixed at its upper end to a channel member 117 which is longitudinally slidable on member 58 but releasably bolted to the member by bolts 118. It will be understood of course that in making minor repairs to the conveyor assembly the bolts 118 are removed along with the bolts 115 in order that the brackets 114 and 117 can be slid along beams 55 and 58 respectively.

Figure 6:
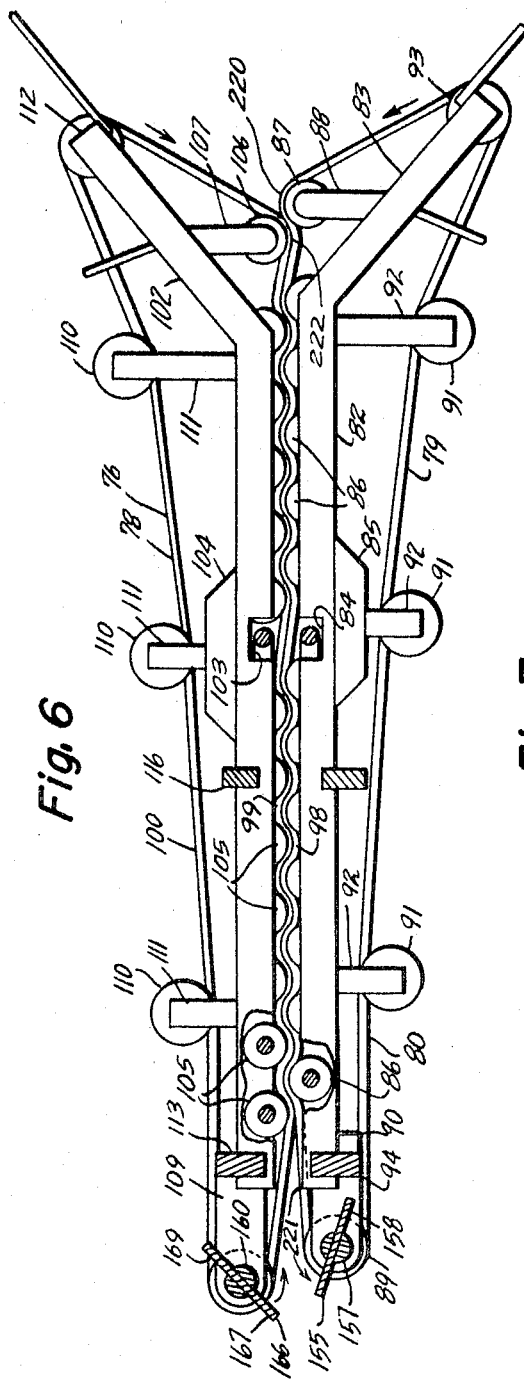
FIG. 6 is a section view showing the stalk conveyor at the right hand side of the harvester as seen along the lines 6—6 of FIG. 2.

As seen in FIG. 6 the working flights 98 and 99 of belts 80 and 100 confront one another and are pressed together by the idler pulley arrangements so that the upper ends 243a of the stalks are positively and continuously gripped between the belts as the stalks are carried by the working flights from the receiving end 220 to the discharge end 221 of the stalk conveyor. The path of movement of the working or confronting flights is in an upward and rearward direction indicated by arrow 219 and at the lower end 222 of the path, the pulleys 87 and 106 provide a belt arrangement enabling the stalks to be received between the working flights thereat. Here at the receiving end 220 of the conveyor the stalks 232 are initially gripped above the attached ears as the stalks are cut by the blade of mechanism 65 and thereafter the ear laden portions 233 of the stalks depend or hang down from the flights and are carried through the space between the stripping rolls.

Belts are used in the preferred embodiment although other endless means such as suitable chains may be used in an appropriate arrangement.

Each stripping assembly 77 has spaced trap forming means in the form of a pair of elongated cylindrical roll components 120 and 121 which are spaced apart to accommodate the passage of the corn stalks through the space 163 between the rolls. The spacing is insufficient however to permit the attached ears to pass through the space 163 and hence the ears attached to the stalks are trapped by the rolls 120 and 121 as the ear laden stalks are drawn or pulled through the space 163 by the confronting flights 98 and 99 of the belts of the stalk conveyors. The rolls 120 and 121 are mounted to the rear of the lower end 222 of the flight path so that the ear laden corn stalks 232 are elevated to positions above the gathering assembly 200 before entering the space 163 between the rolls 120 and 121.

The rolls 120 and 121 are preferably made of steel or other suitable durable material and are rotatably mounted in a parallel arrangement seen in the drawings. Each roll has a smooth continuous cylindrical surface 240 which minimizes the amount of friction to which the ears are subjected in being stripped from the stalks. Thus the surfaces 240 are free of friction causing surface indentations and projections frequently employed in roll mechanisms to provide greater frictional contact at the roll surfaces, and are continuous at the perimeter and thus devoid of vanes, fins and other elements that have been used in the past to aid in detaching the ears from the stalks. This smooth continuous type surface arrangement avoids damage to the foliage as the ears are stripped from the stalks by the rolls.

Figure 16:
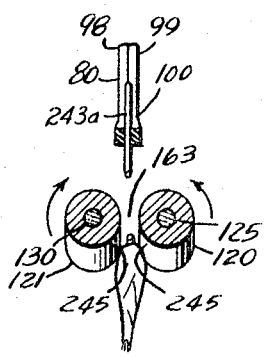
FIG. 16 is a section view taken generally along the lines 16—16 of FIG. 15.

The cylindrical surface portion 240 of rolls 120 and 121 define the elongated space 163 through which the stalks pass through the assembly 77 and the space 163 as seen in FIG. 16 is under the working flights 98 and 99 of the conveyor belts and in vertical working alignment therewith to facilitate the entry of the stalks into the space 163.

Figure 15:
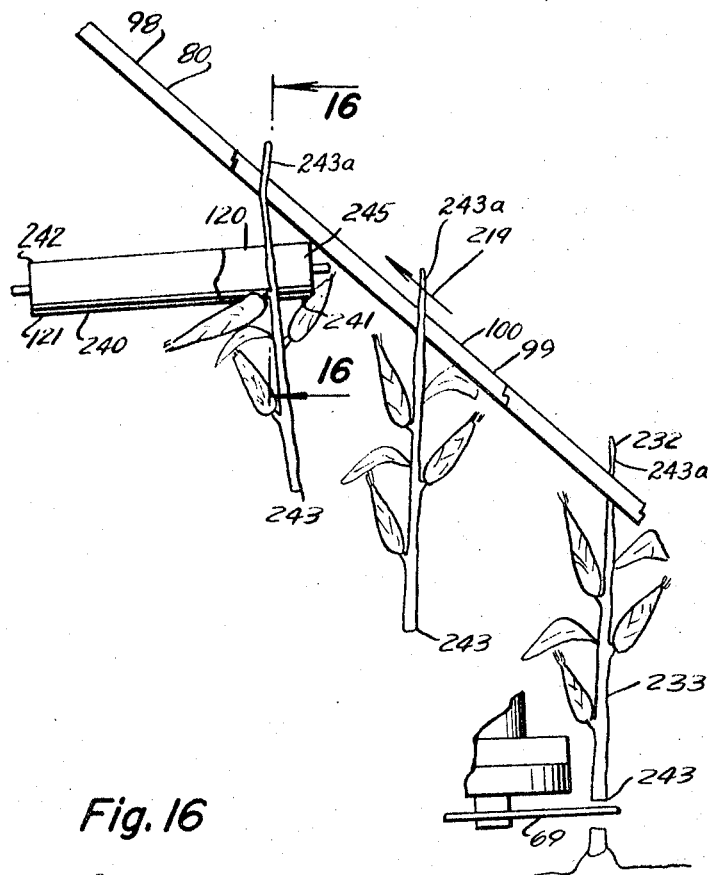
FIG. 15 is a diagrammatic side elevational view showing the belts and rolls of one of the picking mechanisms together with a fragment of the cutting mechanisms associated therewith certain parts being broken away and others being removed to generally illustrate the process involved in the operation of the mechanisms.

The adjacent ends 241 of the rolls at the front of the assembly are located adjacent to the working flights so that the depending ear laden stalk portions 233 of the stalks enter the trap or space at the front end of the assembly. The rear ends 242 of the rolls on the other hand are mounted below the front ends and overall the arrangement is such that the rolls are acutely angled with respect to the flight path over the space 163 as seen in FIG. 15. With this arrangement the butt ends 243 are last to be pulled by the flights 98 and 99 through the space 163 and the action is such that the ears upon encountering and becoming trapped between the rolls, are bent toward the butt ends 243 of the stalks and are stripped from the stalks as the stalk is pulled through the roll assembly. The rolls 120 and 121 and working flights 98 and 99 are thus adapted and arranged to cooperate in bending the trapped ears toward the butt ends of the hanging stalks as the stalks pass through the trap or space 163.

The A-frame component 97 of the rear frame section 53 has an elongated cross member 122 which is offset forwardly of side members 54 and rigidly connected to the side members by structural members 123 and 124. The inboard roll 120 is fixed to an elongated shaft 125 and the rear end of this shaft 125 is journaled in a bearing 126 which is fixed to the adjacent end of the transverse cross piece 122 and best seen in FIG. 10. Shaft 125 extends through the cutout 103 for the support member 101 of the inboard conveyor component and is journaled in a bearing 127 mounted on a cross member 178 associated with the support structure for the roller drive mechanisms. Here the drive sprocket 128 for the inboard roll is fixed to shaft 125.

The outboard roll 121 of the stripping assembly is fixed to another elongated shaft 130. The rear end of shaft 130 is journaled in a bearing 133 and this bearing is fixed at the end of one leg 132 of an L-shape member designated at 131. The other leg 137 is fixed to member 59 and has an attached lug 138 which is bolted to deflector plate 61. The inner leg 132 of member 131 extends inwardly through a cutout 136 in plate 61 to its connection with bearing 133.

The roll carrying shaft 130 extends through the cutout 84 in the outboard conveyor component and at its end is journaled in a bearing 134 mounted on cross piece 178. Here the drive sprocket 135 for the outboard roll 121 is fixed to shaft 133 as seen in FIG. 12.

The rolls 120 and 121 are driven in opposite directions through their sprocket drive connections with chain 181, roll 121 being driven, as seen by the arrows 244 in FIG. 16, in a clockwise direction, and roll 120 in a counter clockwise direction. It should be noted that this provides spaced surfaces 245 at the sides of the space 163 and which are continuously moving toward the butt ends of the stalk. These moving surfaces 245 protect the ears from becoming wedged in the space between the rolls by constantly urging the ears that become trapped in the space back toward the butt end of the stalk.

The drive mechanism 140 for the stalk conveyors 76 is housed in an elongated box like housing 141 which is supported on spaced brackets 142 that are fixed to and extend rearwardly of frame cross member 55. The housing is open at the bottom but has attached internal lugs 143 which are fastened to the plate like brackets 142 by bolts 144.

Mechanism 140 includes a fluid motor 150 which is equipped with a drive sprocket 152 that meshes with an endless chain 149. The motor 150 is mounted on a plate type bracket 151 which is bolted to frame member 155 by a bolt type fastener 153 that passes through a depending leg of the bracket 151 as seen in FIG. 10.

Figure 13:
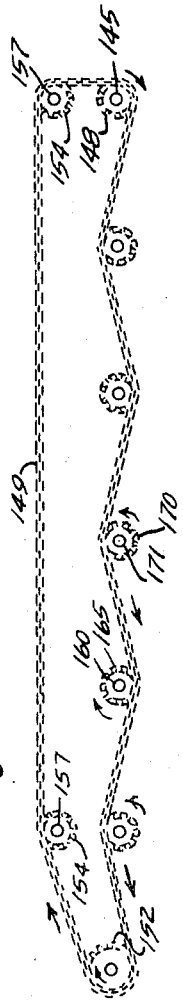
FIG. 13 schematically illustrates the chain drive arrangement for the separate stalk conveyors of the two row harvester as viewed at the top of the housing for the drive mechanism.

The chain drive connection with the driven components of the stalk conveyor at the right side of the harvester is illustrated in FIG. 10 and the general arrangement of the chain drive connection with the sprockets of the stalk conveyors at both sides of the harvester is illustrated schematically in FIG. 13.

As seen in FIG. 10, the drive pulley 89 for the outboard belt 80 is fixed to a shaft 145 which is journaled at its upper end in a bearing 146 that is secured to a rearwardly extending plate bracket 147. This plate 147 is fixed to member 55 above suspension member 94 and here the shaft 145 has a sprocket 148 which meshes with chain 149. Shaft 145 extends through plates 90 and 147 and in the space between the plates the shaft is provided with a flexible rectangular member 156. Member 156 is disposed in an appropriate slot in the shaft and has opposite radially extending sections 158 which rotate about the axis of the shaft during use of the harvester. This arrangement provides a rotating beater 155 above the drive pulley 89 for belt 80 and aids in discharging the stalks at the discharge end 221 of the stalk conveyor.

Plate bracket 147 also carries an idler sprocket 154 and which is attached to a shaft 157 journaled in a bearing 159 that is secured to the plate 147 in back of bearing 146.

The drive pulley 108 for the inboard belt 100 is fixed to an upright shaft 160 which is journaled at its upper end in a bearing 161 that is secured to a rearwardly extending plate section 162 of bracket 114. The upper end of shaft 160 carries a sprocket 165 that meshes with chain 149. Shaft 160 extends through plates 162 and 109 and in the space between these plates is also provided with a rectangular flexible member 167 having opposite sections 169 which provide another beater 166 at the discharge end of the conveyor.

Plate 162 also carries an idler sprocket 170 which meshes with belt 149, the shaft 171 for sprocket 170 being journaled in a bearing 172 that is secured to plate 162 as generally seen in FIG. 10.

The common drive mechanism 174 for the stripping rolls is housed in an elongated transversally extending box like housing 175 which is suspended in front of the front frame section 56 by means of structural members 176 and 177 at the opposite sides of the section. Members 176 and 177 are fixed to the adjacent side members 57 of frame 50 and are fixed at their forward ends to the cross member 178 which is located internally of housing 175.

Figure 14:
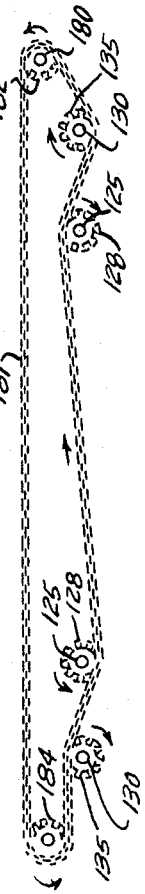
FIG. 14 schematically illustrates the chain drive arrangement for the separate stripping roll assembly as the drive arrangement is viewed at the rear side of the housing therefore.

Mechanism 174 includes a fluid motor 183 which is suitably mounted in the housing and which has a drive sprocket 182 that is mounted on the shaft 180 of the motor. Sprocket 182 meshes with and drives an endless chain 181 that engages the sprockets 128 and 135 of the stripping assembly at the right side of frame 50 as seen in FIG. 12 and engages the corresponding sprockets for the stripping assembly at the left side of frame 50, as seen in the diagrammatic illustration shown in FIG. 14. As seen in the latter figure an idler sprocket 184 is suitably mounted in the housing 175 to facilitate the common drive arrangement for the separate stripping assemblies.

The main conveyor 185 has a receiving end 246 at the front end 11 of the vehicle and a discharge end 247 which is supported spacedly above the rear end 12 of the vehicle by an inclined frame 187. The conveyor has a pair of elongated side plates 186 which are arranged in parallel and fixed to the beams 17 at the front end of the chassis. Here the side plates 186 are connected by a rectangular end piece 199 that prevents the ears of corn which are discharged from the gathering roll assemblies 200 into the receiving area from falling off the endless conveyor belt or apron 190 at the receiving end 246 of the apparatus. The discharge end 247 of conveyor 185 is supported spacedly above the receiving end 246 by an inclined frame 187 that provided adjacent the rear wheels. Frame 187 includes inwardly inclined side posts 188 which are fixed at their lower ends to the adjacent chassis beams 17 and which are rigidly interconnected by suitable cross pieces 189.

The endless apron or conveyor belt 190 is supported on spaced idler rolls 191 and which are provided with shafts 192 that are journaled in suitable end bearings 193 that are fixed to the opposite side plates 186. The drive roll 194 for the conveyor belt 190 is located at the discharge end 247 of the conveyor 185 and the shaft 196 of the drive roll 194 is journaled in bearings 197 and drivingly connected to a fluid motor designated at 195. As seen in FIG. 1 the conveyor extends between the side posts 40b and 40a of the frame 38 and here the side plates 186 are rigidly secured to the platform supporting frame structure. As will be noted in the figures the apron 190 is provided with the usual transversely arranged lugs 198 which aid in gathering loose materials that are to be elevated by such mechanisms.

The gathering roll assemblies 200 beneath the stripping rolls provide a means for gathering the severed ears in the front or receiving end 246 of the main conveyor 185. Each assembly 200 has, as seen by reference to the gathering roll assembly associated with the right hand picking mechanism, a channel type frame work 201 which is open at the side adjacent to the main convoyer. The frame work 201 is rigidly mounted on a pair of brackets 202 and 203, and these brackets are fixed to the adjacent side plates 186. Frame work 201 provides a supporting structure for a plurality of rolls 205 which are laterally arranged one adjacent to the next and which are provided with shafts journaled at their opposite ends in suitable bearings 206. Bearings 206 are mounted between the flanges of the front 207 and the rear 208 channel members of the frame work 201.

The front ends of the roll shafts 204 carry gear wheels 209 which mesh with suitable idler gear wheels 10 that are appropriately mounted on channel 27 between the adjacent wheels 209. This arrangement provides a gear train 211 causing the rolls 205 to rotate in the same direction so as to carry the stripped ears into the receiving end 246 of the main conveyor.

The shaft of the inboard roll 212 extends through the rear channel 208 of frame 201 and is driven by a fluid motor 214 through a gear mechanism 213 which is fastened to the rear channel member 208 of frame 201.

The gear mechanism 213 has an auxiliary power take-off in the form of an upright shaft 215 and this shaft is equipped with four radially extending rectangular flexible members 217 that provide a beater 218 which aids in deflecting stray ears into the receiving area of the main conveyor. It may be mentioned at this point that frame 201 is open at the bottom. This permits some of the trash foliage which is stripped from the stalks along with the ears to fall to the ground through the space between the rolls 205.

Below the discharge end 247 of the main conveyor 185 is an elongated transversally extending box like structure that serves as a housing 225 for a fan 226. This fan 226 serves as a means for pumping air through the gathered ears as they are discharged from the main conveyor and thereby also serves as a means for separating loose foliage which accumulates and is gathered with the harvested crop. Fan 226 is mounted on the shaft of a fluid drive motor 227, and motor 227 is mounted in the housing 225 on a bracket 228 that is fixed to the forward wall 229 of the box like structure. Housing 225 is fixed to the rear side of the conveyor support frame 187 and is located spacedly above the chassis 16 as seen in FIGS. 2 and 4.

Walls 229 has a pair of rectangular openings 231 which are located laterally of the frame side posts 188. These openings 231 are covered by protective screens 230 and serve as inlet ports through which the air is drawn into the housing when the fan is in operation.

The hydraulic system 235 used in supplying the pressurized fluid to the various motors and hydraulically operated devices of the harvester includes a suitable fluid pump 234 which is drivingly connected through a suitable power takeoff (not shown) from motor 21. The system 235 also includes a hydraulic fluid supply tank 236 and which is supported on a pair of laterally extending arms 237 at the right side of the vehicle. These arms 237 are supported on spaced posts 238 which are mounted upright on the adjacent chassis beam 17 and whereat the arms 237 are braced by inclined members 239.

Tank 236 is an elongated rectangular box like structure and has an inner wall 267 which is offset from the outside side wall 268 of the tank. This provides a fluid type compartment for the hydraulic fluid between the walls 267 and 268 and also provides an elongated passageway 270 which extends through the tank and opens at the opposite ends 271 and 272 of the structure.

The rectangular opening 273 at the front end of the tank 236 confronts the screened opening 231 at the right side of the fan housing 225 and with this arrangement, a portion of the air which is drawn into the fan housing is caused to first pass through the passageway 270. This air that is drawn through the passageway 270 serves to cool the inner walls 267 of tank 236 and hence aids in removing heat from the fluid in the tank and which is known in the art to be caused by the pressurized of the fluid during the operation of the hydraulic system 235.

The rear facing wall 274 of the fan housing 225 has a rectangular opening 276 which is located below the discharge end of the main conveyor. This opening is covered by a protective screen 275 and provides a discharge port in the fan housing and through which the air is pumped by the fan into the path of the material discharging from the main conveyor.

The discharge end of the main conveyor is covered by a rearwardly projecting shroud 280 and which is angularly arranged over the receiving area of the auxiliary conveyor 290 so as to deflect the air entrained trash toward the side of the vehicle.

Shroud 280 has opposite side wall plates 281 and 282 and a top wall plate 283 that has an arcuate rear section 284 which tends to deflect the air entrained trash toward the ground 285 at the right side of the vehicle. The side plates 281 and 282 are welded to the rear wall 274 of the fan housing 225 and the shroud is braced by appropriate braces 286 and 287. The side plates 281 and 282 are rigidly interconnected beneath the discharge port in the fan housing 225 by an inclined plate 288 that aids in deflecting the conveyor discharge into the receiving area of the auxiliary conveyor. Plate 288 is also welded to the fan housing beneath the discharge port 276.

The auxiliary conveyor 290 is supported on a turntable type mechanism 300 at the rear end of the vehicle and which is provided with an elevator mechanism or component 335 that provides a means for raising and lowering the discharge end 249 of the conveyor as the need arises. The receiving end 248 of the auxiliary conveyor is located below the discharge end 247 of the main conveyor and the discharge end 249 of the auxiliary conveyor is arranged for pivotal movement about a vertical axis established by a pin component 302 of mechanism 300. The conveyor 290 comprises a frame having elongated side plates 291 which are spaced apart at the receiving end 248 and discharge end 249 of the conveyor by appropriate transversally arranged cross pieces 292.

The endless flexible conveyor belt or apron 293 of conveyor 290 is supported by idler rolls 294 which are mounted between the side plates 291 on appropriate shafts 295 that are journaled at their opposite ends in bearings mounted on the side plates 291. The drive roll 297 is mounted on a shaft 298 at the discharge end 249 of the conveyor 290 and is connected to a fluid driven motor 299 which is mounted on the adjacent side plate of the frame structure.

At the receiving end 248 of the conveyor, the side plates 291 are connected by a transverse end plate designated at 277, rectangular side members 278 and 279 are mounted on the side plates at this end 248 of the conveyor to aid in deflecting the discharge from the main conveyor into the receiving area of the auxiliary conveyor.

Mechanism 300 includes a flat head king pin 302 which establishes a vertical axis on the chassis for pivotal movement of the conveyor from the solid line position shown in FIG. 1 to the lateral position shown therein in broken lines. The shank 302a of pin 302 extends through a flanged cylindrical sleeve 303 which is fixed to and mounted upright on a chassis cross plate 304. The shank 302a extends through plate 304 and carries a flat washer element 306 at the bottom of plate 304 and which is held in place by a cotter pin 305.

Pin 302 is adapted to rotate in the flanged sleeve 303 and a horizontal plate 307 which is equipped at its opposite ends with upright lugs 308 is horizontally arranged on and fixed to the head 301 of the pin 302. A shaft 309 extends through the lugs 308 and serves to establish an axis for pivotal movement of the conveyor when the discharge end is being raised and lowered by manipulation of mechanism 335.

The conveyor 290 is supported on a shaft component 309 of mechanism 300 by means of a pair of spaced and depending lugs 311 which are fixed at the opposite ends of a transverse cross plate 310 of the conveyor frame.

Mechanism 300 also has a rigid frame 312 which is mounted at one end on shaft 309 and which at the other end is supported through appropriate rollers on an arcuate rail forming member 316 which is fixed to the chassis and braced by gussets 317.

Frame 312 has spaced side members 313 which are rigidly interconnected above the king pin 302 by a cylindrical sleeve 314 through which the shaft 309 extends at the pivotal connection with the conveyor 290. The side pieces 313 are also connected by a flat plate 315 which provides a mounting place for the winch 318 of the elevator mechanism.

At the rail end of frame 312, each side member 313 is equipped with a pair of depending lugs 319 which are angularly arranged and spaced apart. Here the frame 312 is supported on the arcuate rail 316 through rollers 320 which are mounted on pins carried by the lugs.

The conveyor 290 can be swung about the axis of the king pin between the lateral position shown in broken lines in FIG. 1 and the rearwardly extending position shown in solid lines in this figure, and is retained in the selected position by means of a latch mechanism designated at 323. The latch 323 comprises an inverted channel type element 324 which is fixed to a depending plate 325 that is secured to a transverse sleeve component 322 of frame 312. The latch mechanism has a pawl 326 which is slidably mounted in appropriately aligned holes in the flanges of the channel element 324. The pawl carries a compression spring 327 which operates against a radially extending flange component 328 of the pawl so as to urge the working end of the pawl towards the rail side of the channel section 324. Here rail 316 is provided with a plurality of spaced holes 329 which are adapted to receive the end 330 of the pawl at various positions between those shown in FIG. 1 for the conveyor and at which the conveyor can be retained by the mechanism 323. The pawl is equipped with a handle 331 to facilitate hand manipulation to release the mechanism during the process of changing from one position for the conveyor to another.

The elevator mechanism 335 includes a rigid frame 336 which is pivotally connected to frame 312 by means of an elongated shaft 337 which is arranged in parallel with shaft 309. Each of the side members 313 of frame 312 is equipped with a pair of outwardly extending lugs 332, and frame 336 has a pair of elongated side members which are spaced apart and arranged at their ends between the lug components 332 of frame 312. Here a shaft 337 extends through the lugs 332 and the adjacent ends of the frame side members 338 and also through the end sleeve 322 of frame 312. Sleeve 322, as seen in FIG. 7, spans the distance between the inside lug elements 332 on frame 312.

The auxiliary conveyor 290 has a pair of elongated channel sections 333 which are fixed to the adjacent side plate 291 at the opposite sides of the conveyor. These channels are transversally arranged on the conveyor and extend beneath the conveyor side plates as seen in FIG. 4 and each is provided with an elongated slot 334.

The outer end of frame 336 comprises an elongated tubular structural member which rigidly interconnects the side components 338 of frame 336. This tubular member 339 is arranged between channels 333 and has an elongated rod or shaft which extends through the member 339 and which carries a pair of rollers 340 at its opposite ends. The rollers 340 on shaft 341 are arranged in the slots 334 of the channels 333, and the conveyor is supported on the frame member 336 of mechanism 335 through the rollers 340. Intermediate the opposite ends of member 339 is mounted a pulley 342, and the winch cable 343 passes from the drum 344 of the winch around pulley 342 to a chain connection with the support plate for the winch. Winch 318 is provided with a handle for paying out and drawing in the winch cable 343 so as to lower and raise the discharge end of the auxiliary conveyor and is provided with a suitable ratchet mechanism.

Figure 7:
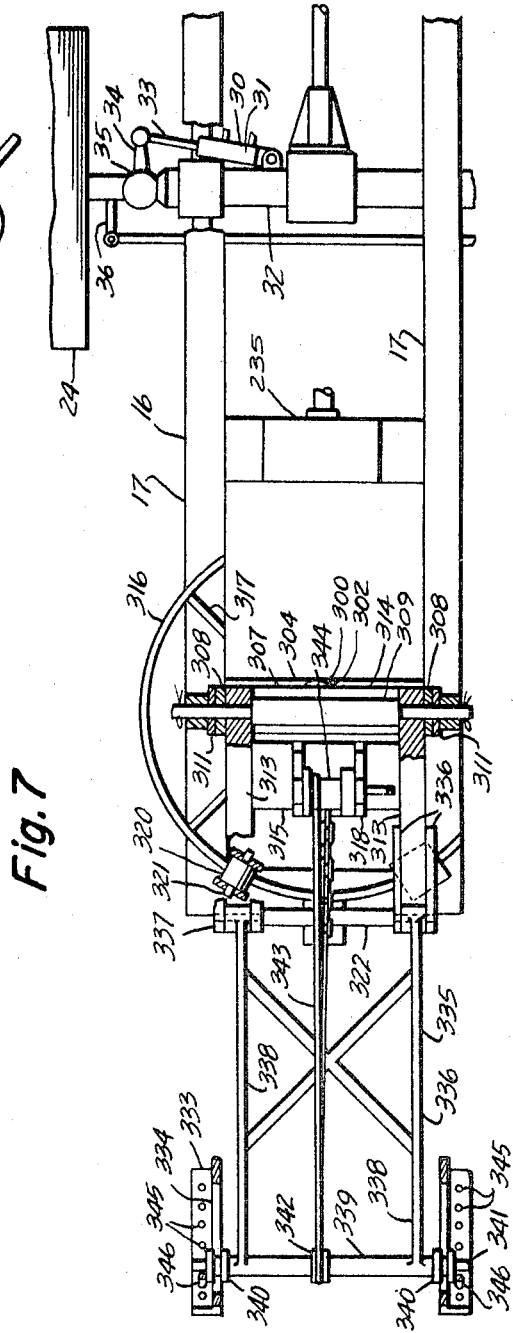
FIG. 7 is a section view at the rear end of the harvester as generally taken along the lines 7—7 of FIG. 4.
Figure 8:
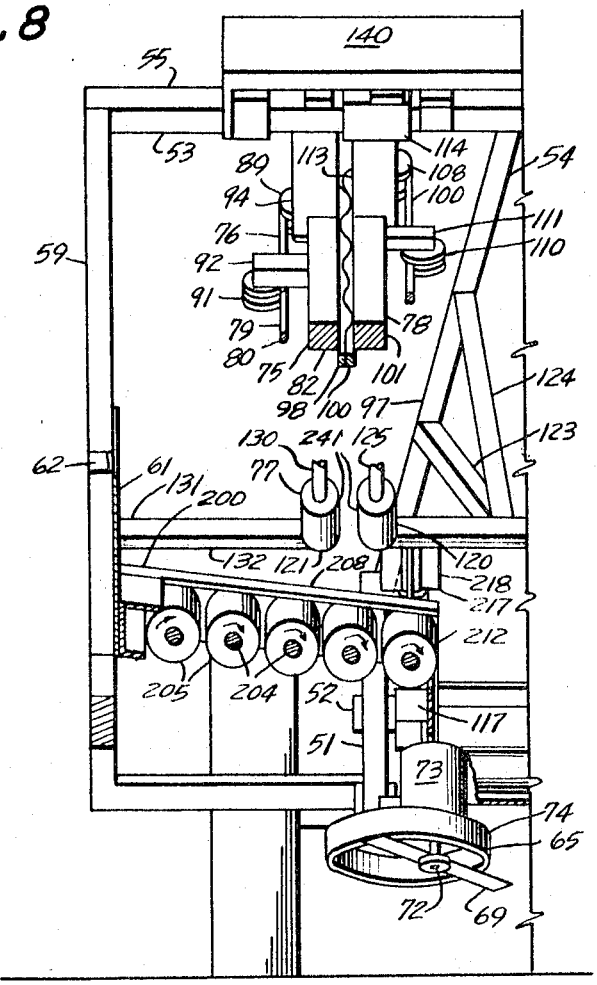
FIG. 8 is a section view showing parts of the picking mechanism at the right side of the vehicle together with associated adjacent structure as seen generally along the lines 8—8 of FIG. 5.
Figure 9:
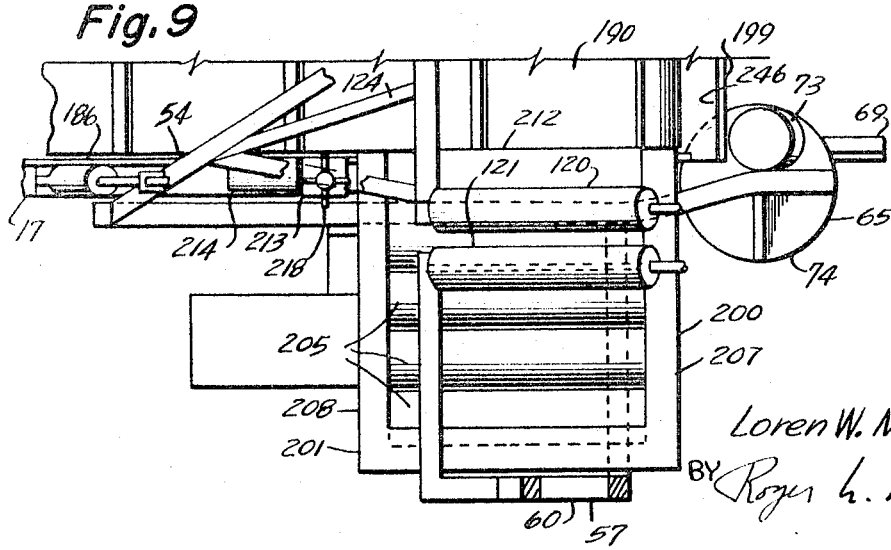
FIG. 9 is a section view showing the rolls of the picking mechanism at the right hand side of the harvester together with the underlying gathering roll assembly and adjacent components as seen generally along the lines 9—9 of FIG. 5 with certain parts being removed.

It will be noted in FIG. 7 that the flanges of channels 333 project laterally of the conveyor side plate 291 and are provided with aligned holes 345 which are adapted to receive a pin type element 346. When the auxiliary conveyor is elevated by manipulation of the winch, frame 336 is caused to pivot about the axis of shaft 337 toward frame 312 rearwardly in the slots 334 of channel 333. Pins 346 are then placed in the appropriate holes 345 in the channel flanges so that upon release of the ratchet mechanism of winch 318 the ends of the shaft 341 come to bear against the pins 346 to sustain the conveyor in the elevated position selected.

In employing the harvester 10 to harvest a crop, the vehicle 15 is guided by the operator along the rows of standing corn in a manner such that the upper ends of the standing stalks in each row pass between the lateral extensions 83 and 102 of the stalk conveyors 76. Here the belts 80 and 100 of the conveyors aid in deflecting the upper ends of the stalks into the receiving ends 220 of the stalk conveyors. It will be noted that the extensions 102 for the inboard pulley support stuctural members are interconnected by a V-shaped rod whereas the outboard extensions carry angularly arranged rods which aid in gathering the stalks at the receiving ends of the stalk conveyors.

As the upper ends 243a of the standing stalks enter the receiving ends 220 of the stalk conveyors and are gripped by the belts, the blades of the cutting mechanism 65 sever the stalks adjacent the ground. Thereafter the stalks are carried along a rearwardly inclined path and through the space 163 between the stripping rolls 120 and 121. Here as previously explained the ears are trapped by the rolls and caused to bend toward the butt end of the stalk while the stalk is being pulled through the space between the rolls by the working flights of the stalk conveyor. The rotary motion imparted to the rolls 120 and 121 prevents the ears from becoming wedged in the space 163 and by providing roll surfaces which are smooth and continuous, practically no damage occurs to the ears as they are being detached or stripped from the stalks. During use it has been found that roll surfaces become moist with fluids from the harvested crop and this is advantageous for such fluids tend to lubricate the roll surfaces and further decrease the amount of friction which occurs between the husks and roll surfaces during the process of stripping the ears from the stalks.

After the ears have been stripped from the stalks, the stalks are discharged from the conveyors at their discharge ends 221. Here the beaters 155 and 166 aid in moving the stripped stalks out of the discharge area so as to avoid entanglements which otherwise may clog the discharge area. Once discharged from the stalk conveyors the stripped stalks fall from the conveyor and are deflected by the deflector plates to the ground at the sides of the chassis.

The ears which are detached from the stalks in the stripping assembly fall onto the gathering rolls of the roll assemblies 200 therebelow and are conveyed into the receiving end 220 of the main conveyor 185 by the roll movement in such assemblies. Beaters 218 are provided to aid in deflecting stray ears into the receiving area for the conveyor 185. It will be understood of course that during the process of stripping the ears from the stalks some of the foliage is also sometimes stripped from the stalks. A portion of this foliage passes between the rolls of the gathering roll assemblies 200 and falls to the ground at the front end of the vehicle whereas the balance is carried into the receiving end 220 of the stalk conveyor along with the ears of corn.

The main conveyor of course serves to transport the harvested crop to the rear end of the vehicle and the discharge end of the main conveyor is elevated so as to facilitate a suitable arrangement for the fan to operate and separate the trash foliage from the ears. Thus, as the ears discharge from the main conveyor 185 and fall into the receiving end 248 of the auxiliary conveyor, the air pumped by fan 226 entrains the lighter trash foliage and carries it by virtue of the shroud arrangement, to the right side of the vehicle where it falls to the ground.

By virtue of the turntable mechanism, the auxiliary conveyor can be so positioned that the discharge end thereof is either rearwardly offset from the rear end 12 of the vehicle or laterally offset from the left side of the vehicle. This has certain advantages in that it enables the harvester to be used with support vehicles to receive the harvested crop. During the first few passes through a field in the process of harvesting a crop, there is usually inadequate space to enable the support vehicles to operate at the sides of the harvester and hence the support vehicles can either be trailed behind or operated independently in back of the harvester and receive the crop from the harvester by suitably positioning the auxiliary conveyor in the solid line position shown in FIG. 1. Subsequently the support vehicles for receiving the harvested crop can be operated at the side of the harvester and under such circumstances the auxiliary conveyor can be swung to the position shown in broken lines in FIG. 1.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a row crop corn harvester having a stalk cutting mechanism for severing standing ear laden corn stalks from the ground, and a picking mechanism for detaching the ears from the stalks severed by the cutting mechanism, the improved picking mechanism comprising spaced means having a space therebetween which will accommodate the passage of severed corn stalks therethrough for trapping ears attached to the severed corn stalks during their passage through said space, and endless driven means having confronting flights that have an upwardly inclined path of movement extending over said space for pulling the severed corn stalks through said space, said flights being arranged at the lower end of the path to therebetween receive ear laden corn stalks severed by the cutting mechanism, said flights being arranged along the path to therebetween positively grip the received corn stalks above the ears attached thereto so that the received corn stalks hang downwardly from the flights and are carried along the flight path through said space, and said spaced means being adapted and arranged to cooperate with the flights in bending trapped ears attached to the hanging stalks toward the butt ends thereof as the hanging corn stalks pass through said space.

2. In a row crop corn harvester having a stalk cutting mechanism for severing standing ear laden corn stalks from the ground, and a picking mechanism for detaching the ears from the stalks severed by the cutting mechanism, the improved picking mechanism in accord with claim 1 wherein said spaced means comprise a pair of elongated rolls having smooth continuous surface portions that define said space, and wherein the improved picking mechanism further comprises means drivingly connected to said rolls for rotating said rolls in opposite directions opposing the passage of trapped ears through said space.

3. In a row crop corn harvester having a stalk cutting mechanism for severing standing ear laden corn stalks from the ground, and a picking mechanism for detaching the ears from the stalks severed by the cutting mechanism, the improved picking mechanism comprising a pair of elongated rolls which are spaced apart in a substantially parallel arrangement and which have smooth continuous surface portions that define a space between the rolls which will accommodate the passage of severed corn stalks therethrough, said rolls being arranged to trap ears attached to the severed corn stalks during their passage through the space; said improved picking mechanism further comprising endless driven means having confronting flights that have an inclined path of movement extending over said space for pulling the severed corn stalks through said space, said flights being arranged at the lower end of the path to therebetween receive ear laden corn stalks severed by the cutting mechanism, said flights being arranged along the path to therebetween positively grip the received corn stalks above the ears attached thereto so that the received corn stalks hang downwardly from the flights and are carried along the flight path through said space, and said rolls being adapted and arranged to cooperate with the flights in bending trapped ears attached to the hanging stalks toward the butt ends thereof as the hanging corn stalks pass through said space; and said improved picking mechanism further comprising means driving connected to said rolls for rotating said rolls in opposite directions opposing the passage through said space of ears trapped by the rolls.

4. In a row crop corn harvester having a stalk cutting mechanism for severing standing ear laden corn stalks from the ground, and a picking mechanism for detaching the ears from the stalks severed by the cutting mechanism, the improved picking mechanism in accord with claim 3 where said rolls have opposite ends including adjacent ends located below and adjacent to said confronting flights, and where said rolls are acutely angled with respect to the flight path over said space.

5. A row crop corn harvester comprising a self-propelled vehicle having a front end, a rigid frame mounted on said vehicle at said front end, a cutting mechanism carried by said vehicle in front of said front end for severing standing ear laden corn stalks from the ground during advancement of the vehicle, and a picking mechanism for detaching the ears from stalks severed by the cutting mechanism; said picking mechanism having an ear stripping assembly which is mounted on the frame and which includes a pair of elongated components that are spaced apart to provide a space therebetween which will accommodate the passage of severed corn stalks therethrough, said picking mechanism further having a stalk conveyor which is mounted on the frame and which includes a pair of elongated components that are spaced apart to provide a space therebetween which will accommodate the passage of severed corn stalks therethrough, said picking mechanism further having a stalk conveyor which is mounted on the frame and which includes endless driven means having confronting flights that have an upwardly and rearwardly inclined path of movement extending over the space between the components for pulling severed corn stalks through the space between said components, and said flights being arranged at the lower end of said path to therebetween receive ear laden corn stalks severed by said cutting mechanism and further arranged along said path to therebetween positively grip the received corn stalks above the ears attached thereto so that the received corn stalks hang downwardly from the flights and are carried along the flight path through said space; said components being below the flights and arranged so that the space therebetween is located to the rear of the lower end of the flight path and in vertical alignment with the flights thereabove, said elongated components being further arranged to trap ears attached to corn stalks carried through said space, said components being adapted and arranged to cooperate with the flights in bending trapped ears attached to the hanging stalks toward the butt ends thereof as the stalks are pulled through said said space, and each of said components having a front end which is located adjacent to said flights and being arranged to extend rearwardly from its front end in a substantially parallel arrangement with the other of the components and at a generally acute angle with respect to the flight path thereabove, whereby downwardly hanging stalks gripped by the flights enter the space at the front ends of said components and above the ears attached thereto.

6. A row crop corn harvester in accord with claim 5 further comprising pivot means pivotally connecting said frame to said vehicle, and hydraulically powered means for pivotally moving said frame to raise and lower said confronting flights at said lower end of said path, and wherein said vehicle comprises front and rear wheels, and controllable steering means operatively connected to steer said vehicle by movement of all of said wheels.

7. A row crop corn harvester in accord with claim 5 where each of said components is an elongated roll having a smooth continuous surface portion, where the surface portions of the rolls define said space, and wherein said picking mechanism further has means drivingly connected to said rolls for rotatably moving said rolls in opposite directions that oppose the passage of trapped ears through said space.

8. A row crop corn harvester in accord with claim 5 wherein said vehicle has a rear end, and wherein said harvester further comprises an elongated conveyor having a receiving end at which the ears detached by the picking mechanism are gathered and a discharge end supported spacedly above said rear end and at which the gathered ears are discharged from said elongated conveyor, and fan means for pumping air through the gathered ears at the discharge end of said elongated conveyor to separate loose foliage accommulations gathered with said gathered ears.

9. A row crop corn harvester in accord with claim 5 wherein said vehicle has a rear end, and wherein said harvester further comprises a main conveyor mounted on the vehicle having a receiving end at the front end of the vehicle and a discharge end supported at the rear end of the vehicle above said receiving end, driven gathering means below said elongated components for gathering the stripped ears at said receiving end, and an auxiliary conveyor mounted at the rear end of said vehicle for pivotal movement about a vertical axis thereat; said auxiliary conveyor having a receiving end located below said discharge end and a discharge end arranged for movement about said vertical axis between a position offset rearwardly of said rear end and another position laterally of said vehicle, said harvester further comprising a mechanism having a component establishing said vertical axis, and means for raising and lowering the discharge end of said auxiliary conveyor, and said auxiliary conveyor being arranged to receive ears discharged from said main conveyor.

10. A row crop corn harvester in accord with claim 5 wherein said vehicle has a rear end, and wherein said harvester further comprises a main conveyor mounted on the vehicle having a receiving end at the front end of the vehicle and a discharge end supported at the rear end of said vehicle above said receiving end, gathering means below said elongated components for gathering the stripped ears at said receiving end, and an auxiliary conveyor having a receiving end located below said discharge end and arranged to receive the ears discharged from said main conveyor, said auxiliary conveyor further having a discharge end arranged for movement about said vertical axis between a position rearwardly of said rear end and another position laterally of said vehicle, said harvester further comprising a supporting mechanism mounted on said vehicle and supporting said auxiliary conveyor, said supporting mechanism having a component establishing said vertical axis and a component for raising and lowering the discharge end of said auxiliary conveyor, frame means supporting said main conveyor at its discharge end, and fan means supported by said frame means below the discharge end of said main conveyor for separating loose foliage accumulations gathered with the stripped ears.

11. In a row crop corn harvester having a stalk cutting mechanism for severing stand ear laden corn stalks from the ground, and a picking mechanism for detaching the ears from the severed stalks and having means that cooperate in bending the attached ears toward the butt ends of the severed corn stalks, the improvement where said means comprises a pair of elongated substantially parallel rolls which are spaced apart and have smooth continuous surface portions that define the space between the rolls, said rolls being sufficienty spaced apart to accommodate the passage of severed corn stalks through the space therebetween and insufficiently spaced to permit ears attached to the severed corn stalks to pass through the space, means adapted to grip the upper end of an ear laden severed corn stalk and from said upper end to pull the corn stalk through said space, and means drivingly connected to said rolls for rotating the rolls in opposite directions that oppose the passage of the ears through said space.

References Cited

UNITED STATES PATENTS

| | | | |
|---|---|---|---|
| 800,094 | 9/1905 | Fleming | 56—66 |
| 879,404 | 2/1908 | McInturf | 56—66 |
| 2,614,378 | 10/1952 | Barnard et al. | 56—107 |
| Re. 19,672 | 8/1935 | Malcolm et al. | 171—34 |
| 2,223,704 | 12/1940 | Powell. | |
| 2,414,512 | 1/1947 | Ekholm | 56—107 |
| 2,770,087 | 11/1956 | Hurlbut | 56—18 XR |
| 2,826,031 | 3/1958 | Hansen | 56—18 XR |

ANTONIO F. GUIDA, Primary Examiner

U.S. Cl. X.R.

56—107; 171—34

PO-1050
(5/69)

UNITED STATES PATENT OFFICE
CERTIFICATE OF CORRECTION

Patent No. 3462921      Dated August 26, 1969

Inventor(s) Loren W. Meredith

It is certified that error appears in the above-identified patent and that said Letters Patent are hereby corrected as shown below:

Column 1, Line 60, after "stalks" (second occurrence) insert
    are --;
    Line 61, after "In" insert -- most cases the harvesters ar
    equipped with picking --.
Column 2, Line 18, "objects" should read -- objections --;
    Line 71, before "rolls" insert -- the --.
Column 5, Line 30, that portion of the line reading "52,
    elements" should read -- 52. Elements --.
Column 11, Line 7, "27" should read -- 207 --;
    Line 70, "pressurized" should read -- pressurization --.
Column 16, Line 18, "driving" should read -- drivingly --;
    Line 44, cancel beginning with "a pair of" to and including
    "includes" in Line 49 of the same column;
    Line 56, before "further" insert -- being;
    Line 70, cancel "said" (first occurrence).
Column 17, Line 29, "accommulations" should read -- accumula-
    tions --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents